US008293848B2

(12) United States Patent
Plantenberg et al.

(10) Patent No.: US 8,293,848 B2
(45) Date of Patent: Oct. 23, 2012

(54) CURABLE COMPOSITIONS CONTAINING AQUEOUS DISPERSIONS OF ORGANOPOLYSILOXANES

(75) Inventors: Thomas Plantenberg, Leverkusen (DE); Klaus Helpenstein, Monchengladbach (DE); Ralf Dunekake, Duesseldorf (DE); Johann Klein, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 233 days.

(21) Appl. No.: 12/786,007

(22) Filed: May 24, 2010

(65) Prior Publication Data

US 2010/0234517 A1 Sep. 16, 2010

Related U.S. Application Data

(63) Continuation of application No. PCT/EP2008/067148, filed on Dec. 9, 2008.

(30) Foreign Application Priority Data

Dec. 14, 2007 (DE) .................. 10 2007 060 919
Jan. 3, 2008 (DE) .................. 10 2008 003 155

(51) Int. Cl.
C09J 183/04 (2006.01)
C08L 83/04 (2006.01)

(52) U.S. Cl. ......... 525/477; 524/588; 525/452; 525/474

(58) Field of Classification Search .................. None
See application file for complete search history.

(56) References Cited

U.S. PATENT DOCUMENTS

| 3,294,725 | A | 12/1966 | Findlay et al. |
| 3,355,406 | A | 11/1967 | Cekada, Jr. et al. |
| 3,360,491 | A | 12/1967 | Axon |
| 3,779,967 | A | 12/1973 | Camp |
| 3,925,242 | A | 12/1975 | Sagi et al. |
| 4,221,688 | A | 9/1980 | Johnson et al. |
| 4,244,849 | A | 1/1981 | Saam |
| 4,554,187 | A | 11/1985 | Grape et al. |
| 4,584,341 | A | 4/1986 | Huebner et al. |
| 4,608,412 | A | 8/1986 | Freiberg |
| 4,618,642 | A | 10/1986 | Schoenherr |
| 4,624,900 | A | 11/1986 | Fau |
| 4,803,233 | A | 2/1989 | Narula et al. |
| 4,816,506 | A | 3/1989 | Gamon et al. |
| 4,918,131 | A | 4/1990 | Gamon et al. |
| 5,004,771 | A | 4/1991 | Feder et al. |
| 5,140,061 | A | 8/1992 | Feder |
| 5,145,901 | A | 9/1992 | Feder |
| 5,360,851 | A * | 11/1994 | Feder et al. .................. 524/157 |
| 5,721,026 | A | 2/1998 | Feder et al. |
| 5,817,717 | A * | 10/1998 | Lievre et al. .................. 525/58 |
| 5,973,061 | A | 10/1999 | Feder et al. |
| 6,077,611 | A * | 6/2000 | Griswold et al. .......... 428/423.3 |
| 6,147,156 | A * | 11/2000 | Yamaya et al. .............. 524/806 |
| 6,528,580 | B1 * | 3/2003 | Feder et al. .................. 524/801 |
| 6,545,086 | B1 * | 4/2003 | Kosal ............................. 524/806 |
| 2004/0054070 | A1 | 3/2004 | Bouvy et al. |
| 2006/0025517 | A1 * | 2/2006 | Guichard et al. ............. 524/588 |
| 2009/0131567 | A1 * | 5/2009 | Chaussade et al. ........... 524/280 |
| 2010/0043933 | A1 * | 2/2010 | Breunig ..................... 152/209.1 |

FOREIGN PATENT DOCUMENTS

| DE | 2047919 | 4/1971 |
| DE | 2157580 | 6/1972 |
| DE | 2129987 | 2/1973 |
| DE | 29919310 | 3/2001 |
| EP | 169098 | 1/1986 |
| EP | 266729 | 11/1987 |
| EP | 304719 | 8/1988 |
| EP | 332544 | 2/1989 |
| EP | 365439 | 10/1989 |
| EP | 410899 | 1/1991 |
| EP | 1069148 | 1/2001 |
| FR | 2637606 | 12/1990 |
| FR | 2638166 | 1/1991 |
| FR | 2642765 | 4/1991 |
| FR | 2771098 | 5/1999 |
| WO | WO 93/15159 | 8/1993 |
| WO | WO 94/09059 | 4/1994 |
| WO | WO 97/47687 | 12/1997 |
| WO | WO 2006/084972 | 8/2006 |
| WO | WO 2007/003731 | * 1/2007 |

OTHER PUBLICATIONS

International Search Report issued for International Patent Application No. PCT/EP2008/067148 mailed Apr. 8, 2009.

* cited by examiner

*Primary Examiner* — Marc Zimmer
(74) *Attorney, Agent, or Firm* — Steven C. Bauman; James E. Piotrowski

(57) ABSTRACT

Curable compositions are disclosed, containing at least one organopolysiloxane, which contains at least one hydroxyl group and/or group which can be hydrolyzed, in aqueous dispersion, i) at least one oganopolysiloxane having a dynamic viscosity of 0.05 to 7 (measured according to Brookfield DV-II+, spindle 3, 23° C.), which is free of hydroxyl groups and/or groups which can be hydrolyzed, in aqueous dispersion, at least one cross-linking agent, at least one emulsifier, at least one cross-linking catalyst, at least one aqueous silicon-free polymer dispersion, at least one filler, and optionally water. The compositions are suitable as sealants, adhesives, or coating agents for application in the construction field, in particular in the sanitary field and in the kitchen field. They are characterized in relation to aqueous silicone preparations known up to this point by an improved adhesion spectrum, in particular on plastic substrates.

11 Claims, No Drawings

CURABLE COMPOSITIONS CONTAINING AQUEOUS DISPERSIONS OF ORGANOPOLYSILOXANES

The present invention relates to curable compositions based on aqueous dispersions of condensable, particularly hydroxy-functional, organo-polysiloxanes and their use as an adhesive and sealant.

One-pack sealants capable of being stored with the exclusion of water, which vulcanize with ingress of water at room temperature to form elastomers, are known as so-called "silicone sealants". These products are used in large quantities e.g. in the construction industry. These mixtures are based on polymers that are terminated by silyl groups carrying reactive substituents such as hydrolyzable groups. The hydrolyzable groups can be, for example, alkoxy groups, acetoxy groups, amino groups or oxime groups. These sealants are distinguished by the fact that they exhibit excellent adhesion properties on a multitude of substrates. However, a disadvantage with these sealants is that the hydrolyzable groups are separated from the polymer chain during the crosslinking process in the first step and escape into the surrounding atmosphere. They can therefore be used only to a limited extent in enclosed spaces without an unpleasant odor and/or industrial hygiene drawbacks.

Aqueous dispersions based on viscous silicone oils have been known for some considerable time, which can crosslink to form an elastomer by elimination of water after the evaporation of the water from the dispersion. Volatile organic compounds are not released to a significant extent in these aqueous systems, particularly in dispersions based on hydroxylated silicone oils. Another advantage of the aqueous preparations is that they are relatively easily processed.

It is known for example that the uptake of crosslinking agents (particularly colloidal silica, alkali silicate, polyalkoxysilane, polyalkenyloxysilane, polyacyloxysilane, polyketiminoxysilane, polyaminosilane or polyamidosilane, siliconate, polysilicate, silsesquioxane resin, reactive hydroxylated, alkoxylated or acyloxylated silicone resin) into an aqueous emulsion of hydroxylated silicone oil after incorporating fillers and organometallic catalysts enables a dispersion to be obtained which can crosslink to form an elastomer by elimination of water, cf. e.g. U.S. Pat. No. 4,221,688; U.S. Pat. No. 4,244,849; U.S. Pat. No. 3,355,406; U.S. Pat. No. 3,294,725; U.S. Pat. No. 4,584,341; U.S. Pat. No. 4,618,642; U.S. Pat. No. 4,608,412; U.S. Pat. No. 4,554,187; EP-A-266 729; EP-A-332 544; EP-A-304 719; EP-A-365 439; FR-A-2 642 765; FR-A-2 637 606; FR-A-2 638 166).

In the documents DE-A-2047919; DE-A-2157580; DE-A-2129987 and EP-A-169 098, to obtain an aqueous emulsion of hydroxylated silicone oil it is proposed to start from an already polymerized hydroxylated oil and to add this to an aqueous emulsion, stabilizing the emulsions using an anionic and/or nonionic surfactant. The conventional methods (use of equipment of the ball mill or homogenizer type) are limited to emulsifying polymers with a viscosity of less than about 5000 mPas; however, more viscous oils can be emulsified with difficulty but to the disadvantage of the particle size and therefore the stability of the emulsion thus obtained, the particle size remaining very coarse, very often over 1 µm. For this reason, the reactive silicone oil emulsion used is generally obtained by emulsion polymerization of cyclic or linear oligomers having a low molecular weight, which are easy to emulsify by conventional methods, i.e. using an anionic surfactant which also preferably acts as the polymerization catalyst (U.S. Pat. No. 3,294,725; U.S. Pat. No. 3,360,491).

According to the recommendations of U.S. Pat. No. 4,608,412, dispersed polymers with very high molecular weights (MW>200 000) are needed to obtain sealants with good mechanical properties, particularly elongation at elevated break, before and after storing the dispersion in a hermetically sealed cartridge; according to this method, the aqueous dispersions are obtained by emulsion polymerization in the presence of an ionic, often anionic, surfactant, which harms the stability of the sealant and which reduces its performance, such as e.g. a lack of adhesion to a series of substrates found in the construction sector and inadequate mechanical properties.

WO 94/09059 describes aqueous dispersions containing at least one organopolysiloxane oil which can be crosslinked by condensation to form an elastomer, optionally a crosslinking agent, a silane, a mineral filler and a catalytic quantity of a curing compound. These dispersions are produced by kneading a silicone oil phase having a viscosity of at, least 3 Pas, said silicone oil phase containing the crosslinkable organopolysiloxane oil and optionally the crosslinking agent, the silane, the filler and the curing agent. In addition, the mixture contains an aqueous phase containing water and at least one emulsifier. The weight ratio of water to water plus emulsifier is selected such that the viscosity of the aqueous phase is at least as high as the viscosity of the silicone oil phase. This mixture should be kneaded with adequate shear until an oil-in-water emulsion with a particle size of 0.1 to 5 µm is formed. This emulsion may optionally then be diluted with water until a solids content of 25 to 97% is obtained. These dispersions are said to be suitable for the production of elastomeric paints, water-repellent agents for masonry, sealants and/or fire-retardant elastomeric products.

EP 0 410 899 discloses an aqueous silicone oil dispersion containing an oil-in-water emulsion of an α,ω-dihydroxypolysiloxane which is stabilized with at least one anionic or nonionic emulsifier, an aqueous dispersion of an organic (co)polymer having a particle size of between 0.01 and 0.5 µm and a solids content of between 20% and 70% (weight), a crosslinking agent, at least one non-silicate filler and optionally a metal catalyst. This silicone dispersion should have a solids content of at least 40 wt. %. The document suggests that these dispersions can be used in cosmetic compositions for hair, and in particular they are said to increase the durability of a porous elastomer film produced on the hair.

From WO 93/15159, pressure-sensitive adhesive compositions are known which contain a tacky acrylic adhesive. As an additive, this adhesive should contain about 2 to 10 wt. % (based on dry solids) of a polydimethylsiloxane having a number-average molecular weight of between 1,300 and 15,000. This polysiloxane addition is said to improve the cutting properties of the pressure-sensitive adhesive and particularly to prevent edge flow when cut.

The document DE 29919310 U1 describes agents that are suitable for the water-repellent treatment of surfaces. These contain at least two silicone oils of different viscosity and an acrylate dispersion and an aliphatic/aromatic hydrocarbon mixture of $C_{10}$ to $C_{12}$ hydrocarbons. The agents are to be used for the treatment of glass surfaces to provide them with water repellency and to bring about an improvement in transparency so that the pane in question appears clearer and, as it were, more transparent.

A need therefore still exists for water-based silicone sealants which exhibit completely satisfactory mechanical properties. In particular, they should exhibit good adhesion to a multitude of substrates as found in the construction sector—in particular to plastics surfaces.

The object of the present invention is therefore to provide novel water-based silicone oil preparations which cure to form elastomers with high elasticity and exhibit a good range of adhesion. Furthermore, a user-friendly curing time in application is desired.

The subject matter of the present invention can be taken from the claims; it consists in providing a curable composition containing a) at least one organopolysiloxane containing hydroxyl groups and/or hydrolyzable groups in aqueous dispersion,
b) at least one organopolysiloxane having a dynamic viscosity of 0.05 to 7, for example 0.2 to 7, Pa·s (measured by Brookfield DV-II+, spindle 3, 23° C.), which is free from hydroxyl groups and/or hydrolyzable groups, in aqueous dispersion,
c) at least one crosslinking agent,
d) at least one emulsifier,
e) at least one crosslinking catalyst,
f) at least one aqueous silicon-free polymer dispersion,
g) at least one filler,
h) optionally water.

An addition of water to a composition according to the invention in excess of the quantity of water contained in the dispersions used is possible, but not essential.

The present invention substantially provides an aqueous dispersion of silicone oils containing:

a) at least one organopolysiloxane containing hydroxyl groups or hydrolyzable groups,
b) at least one low-viscosity organopolysiloxane, free from hydroxyl groups or hydrolyzable groups,
c) a crosslinking agent,
d) at least one emulsifier,
e) at least one crosslinking catalyst,
f) at least one aqueous silicon-free polymer dispersion,
g) at least one filler,
h) water.

The present invention also provides the use of a composition of the above-mentioned type as a curable adhesive or sealant or coating composition with improved adhesion properties.

The organopolysiloxane containing hydroxyl groups and/or hydrolyzable groups is preferably an α,ω-functional organopolysiloxane having at least two functional groups per molecule, which are condensable after optional hydrolysis.

These organopolysiloxanes can be represented by general formula (1).

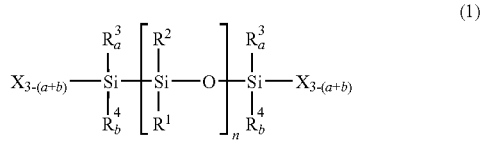

(1)

In formula (1) the following apply:
a=0 or 1,
b=0 or 1,
with a+b=0; 1 or 2;
n possesses a value sufficient to impart the desired viscosity to the polymer of formula (1); preferably n=500-10,000 or 750-10,000, particularly preferably 1,100-6,000, most particularly 1,500-2,000;
the residues X are identical or different and signify
an OH group with a+b=2,
an alkoxy or alkenyloxy residue with 1 to 10 carbon atoms,
an aryloxy residue with 6 to 13 carbon atoms,
an acyloxy residue with 1 to 13 carbon atoms,
a ketiminoxy group with 1 to 8 carbon atoms or
a functional amino or amido group with 1 to 6 carbon atoms, which is bonded to the silicon by an Si—N bond;
the residues $R^1$ and $R^2$ are the same or different and signify organic aliphatic alkyl or alkenyl residues with 1 to 10 carbon atoms or aromatic residues, in particular phenyl residues, these residues optionally being substituted by halogen atoms or cyano groups, with preferably at least 80% of the residues being methyl groups;
the residues $R^3$ and $R^4$ are the same or different and signify organic aliphatic alkyl, aminoalkyl, polyaminoalkyl, epoxyalkyl or alkenyl residues with 1 to 13 carbon atoms, aromatic aryl residues with 6 to 13 carbon atoms;
at least 2 and preferably at least 3 functional groups per molecule being present which are condensable after optional hydrolysis, and preferably at least 80% of the residues $R^1$ to $R^4$ signify a methyl group.

As examples of the residue X, the following groups can be mentioned:

alkoxy, such as e.g. methoxy, ethoxy, octyloxy, alkenyloxy, such as e.g. vinyloxy, hexenyloxy, isoprope-nyloxy, aryloxy, such as e.g. phenyloxy, acyloxy, such as e.g. acetoxy, ketiminoxy, such as e.g. ON=C(CH$_3$)C$_2$H$_5$, amino derivatives, such as e.g. ethylamino, phenylamino, amido derivatives, such as e.g. methylacetamido.

As organic aliphatic or aromatic residues the following can be mentioned:

for $R^1$, $R^2$: for example the groups methyl, ethyl, octyl, trifluoropropyl, vinyl, phenyl;

for $R^3$, $R^4$: for example the groups methyl, ethyl, octyl, vinyl, allyl, phenyl; —(CH$_2$)$_3$—NH$_2$; —(CH$_2$)$_3$—NH—(CH$_2$)$_2$—NH$_2$.

In a preferred embodiment of the curable composition according to the invention, the organopolysiloxane(s) containing hydroxyl groups and/or hydrolyzable groups is/are functionalized at both ends of the chain with a hydroxyl group at each end and contain(s) no other hydroxyl groups or hydrolyzable groups. These OH-terminated organopolysiloxanes are particularly advantageous because they can be condensed together directly. During curing, therefore, no hydrolysis step is needed which would result in the release of the hydrolyzable groups and an associated unpleasant odor and/or industrial hygiene drawbacks. Only water is released by the condensation.

The organopolysiloxane(s) of formula (1) containing hydroxyl groups and/or hydrolyzable groups has/have a dynamic viscosity of 35 to 1000 Pa·s, preferably of 50 to 1000 Pa·s, more preferably of 75 to 500 Pa·s, most particularly preferably 100 to 160 Pa·s (measured by Brookfield DV-II+, spindle 3, 23° C. at a shear gradient of 1 s$^{-1}$).

The low-viscosity organopolysiloxane which is free from hydroxyl groups can be represented by the following formula (2).

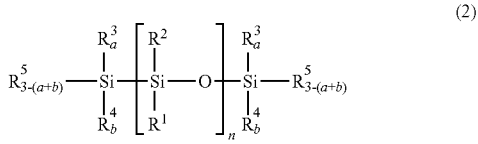
(2)

The residues $R^1$ to $R^4$ have the same meaning here as given above for formula (1); $R^5$ can have the same meaning as $R^1$ or $R^2$. Particularly preferred are low-viscosity organopolysiloxanes in which at least 80% of the residues $R^1$ to $R^5$ signify a methyl group and n is a number from 3 to 100, preferably 5 to 50, particularly preferably 8 to 15.

The low-viscosity organopolysiloxane preferably has a dynamic viscosity at 23° C. of 0.05 to 7 Pa·s, e.g. 0.2 to 7 Pa·s, preferably 0.4 to 3.5 Pa·s, particularly preferably 0.5 to 1.5 Pa·s. The dynamic viscosities mentioned here are generally measured using rotational viscometers, e.g. a Brookfield RVP viscometer. The quantity of low-viscosity organopolysiloxane used in the composition can be varied within broad limits; preferably 1 to 30 parts by weight or parts of low-viscosity organopolysiloxane are added per 100 parts by weight or parts of hydroxyl group-containing or hydrolyzable group-containing organopolysiloxane.

Crosslinking agents that can be used in silicone sealants are known per se; the following can be mentioned as specific and preferred examples of crosslinking agents to be used: colloidal silica, sodium silicate, pyrogenic or precipitated silica, alkali metal organosilicates, microemulsions of a silsesquioxane resin, reactive silicone resins with low molecular weight, particularly a molecular weight of 1000-4000, with alkoxy and/or acyloxy groups, silicone resins with a high molecular weight (insoluble in toluene), particularly with a molecular weight of more than 4000-10000, hydroxylated silicone resins, alkoxysilanes, alkylaminosilanes, alkylamidosilanes. Mixtures of the aforementioned crosslinking agents can also be used. 0.1 to 100 parts by weight crosslinking agents are used per 100 parts by weight organopolysiloxane or mixture of organopolysiloxanes.

The surfactant (emulsifier) to be used for the production of the composition according to the invention can, in principle, be an anionic, cationic or nonionic emulsifier. Typically, and within the framework of the present invention also preferably, however, the emulsifier is a nonionic emulsifier. The emulsifier or the mixture of emulsifiers preferably has an HLB value (hydrophilic lipophilic balance) of 8 to 15. Preferred nonionic emulsifiers are ethoxylation products of long-chain fatty alcohols or alkoxylation products of alkylphenols, or block copolymers of polypropylene oxide/polyethylene oxide can also be used. Other examples of suitable emulsifiers are alkyl glycosides, alkyl polyglycosides, polyalkoxylated fatty amides, sugar ethers or sugar esters. Mixtures of several of the aforementioned emulsifiers may optionally also be used. The emulsifiers are employed in quantities of 1 to 20 parts by weight per 100 parts by weight organopolysiloxane or organopolysiloxane mixture.

As curing or crosslinking catalysts, a large number of catalysts conventional in silane chemistry can be used, these being preferably carboxylic acid salts of lead, zinc, zirconium, titanium, iron, barium, calcium, manganese and in particular of tin. Chelate compounds, such as e.g. dicarbonyl chelates of the above metals, can also be used. Among the tin compounds, in particular the diorganotin dicarboxylates, such as e.g. dibutyltin dilaurate (DBTL), dioctyltin dilaurate, dibutyltin diacetate or dioctyltin diacetate, can also be used. Typical quantity ranges for the crosslinking catalysts to be used are 0.01 to 3 parts by weight of the crosslinking catalyst per 100 parts by weight organopolysiloxane or organopolysiloxanes.

An essential component of the composition according to the invention is at least one aqueous silicon-free polymer dispersion. This/these aqueous dispersion(s) can be selected from polyacrylates, polymethacrylates and acrylate/methacrylate copolymers, polystyrene, styrene copolymers—particularly with acrylates or methacrylates, vinyl acetate polymers or copolymers of vinyl acetate—particularly with ethylene and/or acrylates or styrene, polyolefins and polyurethanes. It is also possible to use mixtures of silicon-free polymer dispersions. The addition of these dispersions contributes to broadening the adhesive properties and improves the adhesion of the composition particularly to plastics.

In a preferred embodiment of the curable composition according to the invention, the silicon-free polymer dispersion is an aqueous polyurethane dispersion. A dispersion of this type brings about a particularly great improvement in adhesion to plastics, particularly compared with acrylate or styrene acrylate dispersions and with vinyl acetate copolymer dispersions.

The production of the aqueous polyurethane dispersion takes place by methods that are known per se. First, an NCO-terminated prepolymer is generally produced by reaction of bi- or polyfunctional alcohols (polyols) with di- or polyisocyanates. These may optionally then be further reacted by chain extension, e.g. with diamines, to form high-molecular-weight polyurethanes. So that a polyurethane dispersion which is self-emulsifying in water is formed, hydrophilic groups, e.g. anionic carboxy or sulfonic acid groups or alternatively cationic groups, are incorporated into the molecule. These polyurethanes can be produced first in inert organic solvents for viscosity reasons. In this case, the solvent or solvent mixture is removed from the emulsion by distillation after the dispersion step in the aqueous phase.

In another preferred embodiment of the curable composition according to the invention, the polyurethane polymer is built up from polyether polyols, polyester polyols, amino-terminated polyoxyalkylenes and/or hydroxy-functional polyolefins as well as di- or polyisocyanates and dihydroxycarboxylic acids.

As isocyanates it is possible in principle to use any industrially available aromatic, aliphatic or cycloaliphatic di- or polyisocyanates. However, the following aliphatic or cycloaliphatic diisocyanates are particularly preferred:

4,4'-dicyclohexylmethane diisocyanate ($H_{12}MDI$), 1-isocyanatomethyl-3-isocyanato-1,5,5-trimethylcyclohexane (isophorone diisocyanate, IPDI), 1,4-cyclohexane diisocyanate, hydrogenated xylylene diisocyanate ($H_6XDI$), 1-methyl-2,4-diisocyanatocyclohexane, m- or p-tetramethylxylene diisocyanate (m-TMXDI, p-TMXDI), dimer fatty acid diisocyanate, 1,4-tetramethoxybutane diisocyanate, 1,4-butane diisocyanate, 1,6-hexane diisocyanate (HDI), 1,6-diisocyanato-2,2,4-trimethylhexane, 1,6-diisocyanato-2,4,4-trimethylhexane, 1,4-butane diisocyanate and 1,12-dodecane diisocyanate ($C_{12}DI$). The corresponding trimeric biuretization or isocyanuratization products of the above diisocyanates can also be used.

As polyols, polyether polyols, polyalkylene diols and polyester polyols can be used. As polyether polyols in this case, the polypropylene glycols or polybutylene glycols which are known per se are used. Examples are bi- and/or trifunctional polypropylene glycols with two or three hydroxyl groups per molecule in the molecular weight range of 400 to 20000, preferably in the range of 1000 to 6000. Random and/or block copolymers of ethylene oxide and propylene oxide can also be used. Another group of polyethers that can preferably be used are the polytetramethylene glycols (polybutylene glycols, poly(oxytetramethylene)glycol, poly-THF) with a molecular weight range of the polytetramethylene glycols of between 600 and 6000.

Suitable as polyester polyols are those that can be produced by condensation of di- or tricarboxylic acids, such as e.g. adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimer fatty acid or mixtures thereof with low-molecular-weight diols or triols such as e.g. ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane or mixtures thereof. Another group of polyols are the polyesters based on ε-caprolactone, also known as "polycaprolactones".

However, polyester polyols of oleochemical origin can also be used. These polyester polyols can be produced e.g. by complete ring opening of epoxidized triglycerides of a fat mixture containing at least partially olefinically unsaturated fatty acids with one or more alcohols having 1 to 12 C atoms and subsequent partial transesterification of the triglyceride derivatives to form alkyl ester polyols having 1 to 12 C atoms in the alkyl residue. Other suitable polyols are polycarbonate polyols and dimer dials (Cognis) as well as castor oil and its derivatives, such as e.g. partially dehydrated castor oil.

As hydrophilic groups, cationic groups in the form of polyamines can be incorporated into the polyurethane molecule, but the polyurethane dispersion preferably has anionic groups, in particular sulfonic acid groups and particularly preferably carboxyl groups. Suitable carboxylic acids for incorporation into the polyurethane framework are dihydroxycarboxylic acids such as dihydroxy-propanoic acid, dihdroxysoxinic acid, dihydroxybenzoic acid or alternatively α,α-dimethylolalkanoic acids such as e.g. 2,2-dimethylolacetic acid, 2,2-dimethylolpropionic acid, 2,2-dimethylolbutyric acid and 2,2-dimethylolpentanoic acid. For the emulsification or dispersion of the carboxylated polyurethane in the aqueous phase, the carboxyl groups are neutralized with a neutralizing agent, for which tertiary amines are preferably used, such as trimethylamine, triethylamine, tributylamine, diethylaniline, triphenylamine, dimethylethanolamine, diethylethanolamine, methyl-diethanolamine or triethanolamine. The neutralizing step in this case can be conducted both in the organic phase and in the aqueous phase. It is also possible to use commercially available polyurethane dispersions for the sealant preparations according to the invention. Examples of these are U-5200VP or U-350VP from Alberdingk-Boley.

The aqueous silicon-free polymer dispersions are used in quantities of 0.01 to 50 parts by weight, preferably 15 to 40 or for example also 0.5 to 10 parts by weight of the polymer dispersion, based on 100 parts by weight organopolysiloxane or organopolysiloxane oil or organopolysiloxane mixture.

As fillers, silicon-containing (reinforcing) fillers can be used to the extent that the silicon-containing additives have not already been used as crosslinking agents. Examples of these are colloidal silica, pyrogenic silica and precipitated silica. Examples of semi-reinforcing fillers are diatomaceous earth, ground quartz and cristobalite. Examples of silicate-free fillers are natural, ground or precipitated calcium carbonate, hydrated aluminum oxide, magnesium hydroxide, carbon black, titanium dioxide, aluminum oxide, mica, zinc oxide, talcum, iron oxide, barium sulfate, slaked lime or mixtures of these fillers. The fillers, in particular the chalks (calcium carbonates), can optionally be surface-treated ("coated"). The average particle size of these fillers should be in the range between 0.001 and 300 μm. The fillers are used in quantities of 50 to 400 parts by weight filler, based on 100 parts by weight organopolysiloxane oil or organopolysiloxane mixture.

In another preferred embodiment of the curable composition according to the invention, the composition additionally contains at least one organo-functional silane. These silanes are preferably used as adhesion promoters. An adhesion promoter is intended to mean a substance which improves the adhesion properties of adhesive layers on surfaces.

Examples of organo-functional silanes are 3-isocyanatopropyltriethoxysilane, 3-isocyanatopropyltrimethoxysilane, 3-(2,3-epoxypropoxy)propyltrimethoxysilane, 3-(2,3-epoxy-propoxy)propyltriethoxysilane, 3-(2,3-epoxypropoxy)propyldiethoxymethyl-silane, 3-(2,3-epoxypropoxy)propylethoxydimethylsilane, 3-mercaptopropyl-trimethoxysilane, 3-mercaptopropyltriethoxysilane, 3-mercaptopropyldiethoxy-methylsilane, 3-mercaptopropylethoxydimethyl-silane and mixtures of the above silanes. In addition, oligomers of the above silanes can be used, examples of these being Dynasylan® 1146, Dynasylan® 6490, Dynasylan® 6498, Dynasylan® 6598, Dynasylan® 9896, Dynasylan® HYDROSIL 1151, Dynasylan® HYDROSIL 2627, Dynasylan® HYDROSIL 2776, Dynasylan® HYDROSIL 2909 or Dynasylan® HYDROSIL 2926 from EvoniK. The quantity of adhesion-promoting or adhesion-reinforcing organo-functional silanes depends here on the substrates to be bonded; they are preferably used in quantities of less than 5, particularly preferably less than 2 wt. %, based on the overall composition of the sealant dispersion.

As additional conventional auxiliary substances and additives, the compositions according to the invention can contain tackifying resins, other adhesion-promoting additives, pigments, plasticizers and/or stabilizers catalysts or mixtures thereof in quantities of 0 to 50 parts by weight per 100 parts by weight of organopolysiloxane or organopolysiloxane oil, or organopolysiloxane or organopolysiloxane oil mixture.

The quantity of water added to the preparation or composition according to the invention depends on the water content of the organopolysiloxane oil dispersion and/or silicon-free polymer dispersion used and the required rheological properties of the composition. It typically contains 1 to 30 parts by weight, preferably 2 to 20 parts by weight water, based on 100 parts by weight organopolysiloxane oil or organopolysiloxane oil mixture.

In another preferred embodiment of the curable composition according to the invention, the composition contains per 100 parts by weight organopolysiloxane or organopolysiloxane mixture or per 100 parts by weight organopolysiloxane oil or organopolysiloxane oil mixture a) 0.1 to 100 parts by weight of at least one crosslinking agent,
b) 1 to 20 parts by weight of a nonionic emulsifier or mixture of emulsifiers,
c) 0.001 to 3, preferably 0.01 to 3, parts by weight of a crosslinking catalyst or catalyst mixture,
d) 0.01 to 50 parts by weight, preferably 15 to 40 or else 0.5 to 10 parts by weight of at least one aqueous polyurethane dispersion,
e) 50 to 400 parts by weight of at least one filler,
f) 1 to 50 parts by weight, preferably 2 to 20 parts by weight water,
g) 0 to 50 parts by weight of other auxiliary substances and additives.

The compositions according to the invention can be produced in a manner that is known per se in mixing equipment with a high shearing action, including e.g. kneaders, planetary mixers, internal mixers, so-called "Banbury mixers", twin-screw extruders and similar mixing equipment known to the person skilled in the art.

Compared with the previously known sealants, adhesives or coating compositions based on aqueous organopolysiloxane dispersions, the compositions according to the invention are distinguished particularly by improved adhesion to a large number of substrates, in particular to the plastics surfaces found in the sanitaryware and kitchen sector.

In the following exemplary embodiments, the invention is intended to be explained in more detail, the selection of the examples not being intended to represent any limitation of the scope of the subject matter of the invention.

EXAMPLES

Example for the Production of the Silicone Emulsion (Basic Emulsion)

372 g α,ω-dihydroxylated polydimethylsiloxane (Bluestar Rhodorsil 48V135000), 28 g low-viscosity polydimethylsiloxane, 4 g silicone resin (Bluestar Resine 4509) and 28 g of an 85% aqueous solution of ethoxylated fatty alcohols are emulsified in 8.5 g water. Next, a further 60 g water, 9 g titanium dioxide and 400 g chalk are incorporated into the emulsion while stirring constantly.

Example for the Production of the Composition with Added Latex (Composition According to the Invention)

180 g basic emulsion and 20 g latex dispersion are emulsified together. 4.7 g silane emulsion (γ-aminopropyltrihydroxysilane) and 0.25 g catalyst emulsion (dioctyltin laurate) are added. Finally, the finished product is packed into a cartridge. After a maturing period of about a week, the product is ready to use.

For the tests performed subsequently, all the dispersions were adjusted to a solids content of 40%—optionally by diluting with water. The increase in peel force was measured relative to the peel force of the basic emulsion with incorporated silane and catalyst emulsion. A bead with a diameter of approx. 0.5-1 cm was applied on to the substrate and cured within one week under controlled climatic conditions (23° C. and 50% relative humidity). The peel force was measured with a tensile testing machine (Zwick Z010) by pulling off the bead at an angle of 90° to the substrate surface. On glazed tiles and glass, a cohesive fracture pattern was observed for all the compositions according to the invention listed as well as for the reference composition. The results are listed in Table 1.

TABLE 1

| No. | Proportion by wt. basic emulsion (%) | Proportion by wt. polymer dispersion (%) | Type of polymer dispersion | Surface material | Increase in peel force (%) |
|---|---|---|---|---|---|
| 1 | 90 | 10 | Polyurethane (U 350 VP)[1] | Polycarbonate | 300 |
| 2 | 90 | 10 | Polyurethane (U 5200 VP)[1] | Polyester | 200 |
| 3 | 95 | 5 | Polyurethane[2] | Polycarbonate, poly(vinyl chloride), poly(methyl methacrylate) | 150 |
| 4 | 90 | 10 | Polyurethane[2] | Poly(methyl methacrylate) | 200 |
| 5 | 90 | 10 | Polyurethane (U 3251)[1] | Poly(methyl methacrylate) | 300 |
| 6 | 90 | 10 | Acrylate (Acronal 81D)[3] | Poly(methyl methacrylate) | 100 |
| 7 | 90 | 10 | Acrylate (Primal 3362)[4] | Poly(methyl methacrylate) | 100 |
| 8 | 90 | 10 | Styrene-acrylate (Acronal 290 D)[3] | Poly(methyl methacrylate) | 25 |
| 9 | 90 | 10 | Styrene-acrylate (Rhoximat DS 910/Axilat DS 910)[5] | Poly(methyl methacrylate) | 25 |
| 10 | 90 | 10 | Vinyl acetate-ethylene copolymer | Poly(methyl methacrylate) | 25 |

[1]Manufacturer: Alberdingk-Boley;
[2]Production: A polyurethane prepolymer is produced by the known methods from 19.4 g poly(THF) ($M_w$ 1000 g/mol), 3.2 g dimethylolpropionic acid and 12.6 g TMXDI and then dispersed in 64 g water;
[3]Manufacturer: BASF;
[4]Manufacturer: Rohm & Haas;
[5]Manufacturer: Rhodia/Hexion Speciality Chemicals The results prove that the addition of polymer dispersions leads to a significant improvement in the adhesion of the compositions to plastics surfaces. Particularly good results are achieved with polyurethane dispersions.

In addition, mechanical parameters were determined for the composition of Example 5 as a function of the proportion by weight of the polymer dispersion, which are contained in Table 2.

TABLE 2

| No. | Proportion by wt. basic emulsion | Proportion by wt. latex | Elongation at break (%) | Breaking strength (N/mm$^2$) | Modulus at 100% elongation |
|---|---|---|---|---|---|
| 5a (not according to the invention) | 100 | 0 | 580 | 0.28 | 0.12 |
| 5b | 90 | 1 | 600 | 0.29 | 0.12 |
| 5c | 95 | 2 | 700 | 0.30 | 0.10 |
| 5d | 90 | 3 | 750 | 0.33 | 0.12 |
| 5e | 90 | 5 | 810 | 0.30 | 0.10 |
| 5f | 90 | 10 | 840 | 0.24 | 0.08 |

The invention claimed is:

1. A curable composition, comprising:
 a) at least one organopolysiloxane containing hydroxyl groups and/or hydrolyzable groups in aqueous dispersion
 b) at least one organopolysiloxane with a dynamic viscosity of 0.05 to 7 Pa·s (measured by Brookfield DV-II+, spindle 3, 23° C.), which is free from hydroxyl groups and/or hydrolyzable groups, in aqueous dispersion
 c) at least one crosslinking agent,
 d) at least one emulsifier,
 e) at least one crosslinking catalyst, f) at least one aqueous silicon-free polymer dispersion,
g) at least one filler;
wherein the silicon-free polymer dispersion is an aqueous polyurethane dispersion.

2. The curable composition according to claim 1, wherein the organopolysiloxane containing hydroxyl groups and/or hydrolyzable groups is functionalized at both ends of the chain with a hydroxyl group at each end and contains no other hydroxyl groups or hydrolyzable groups.

3. The curable composition according to claim 1, wherein the composition additionally contains at least one organofunctional silane.

4. The curable composition according to claim 1, wherein the crosslinking agent is selected from colloidal silica, sodium silicate, pyrogenic or precipitated silica, alkali metal organosilicates, microemulsions of a silsesquioxane resin, reactive silicone resins with a molecular weight of 1000-4000 with alkoxy and/or acyloxy groups, silicone resins with a molecular weight of more than 4000-10000, hydroxylated silicone resins, alkoxysilanes, alkylaminosilanes, alkylamidosilanes or mixtures thereof.

5. The curable composition according to claim 1, wherein the emulsifier is a non-ionic emulsifier.

6. The curable composition according to claim 1, wherein the emulsifier or the mixture of emulsifiers has an HLB value of 8 to 15.

7. The curable composition according to claim 1, wherein the polyurethane dispersion has anionic groups.

8. The curable composition according to claim 1, wherein the polyurethane polymer is built up from polyether polyols, polyester polyols, amino-terminated polyoxyalkylenes and/or hydroxy-functional polyolefins as well as di- or polyisocyanates and dihydroxycarboxylic acids.

9. The curable composition according to claim 1, wherein the organopolysiloxane containing hydroxyl groups and/or hydrolyzable groups has a dynamic viscosity of 35 to 1000 Pa·s (measured by Brookfield DV-II+, spindle 3, 23° C.).

10. The curable composition according to claim 1, containing per 100 parts by weight organopolysiloxane oil or organopolysiloxane oil mixture:
   a) 0.1 to 100 parts by weight of at least one crosslinking agent,
   b) 1 to 20 parts by weight of a nonionic emulsifier or mixture of emulsifiers,
   c) 0.001 to 3 parts by weight of a crosslinking catalyst or catalyst mixture,
   d) 0.01 to 50 parts by weight of at least one aqueous silicon-free polymer dispersion,
   e) 50 to 400 parts by weight of at least one filler,
   f) 1 to 50 parts by weight of additional water,
   g) 0 to 50 parts by weight of other auxiliary substances and additives.

11. An adhesive or sealant with improved adhesion properties, comprising the curable composition according to claim 1.

* * * * *